US012639090B2

(12) United States Patent
Kaul

(10) Patent No.: US 12,639,090 B2
(45) Date of Patent: May 26, 2026

(54) GUEST-ASSISTED LIVE STORAGE MIGRATION

(71) Applicant: Red Hat, Inc., Raleigh, NC (US)

(72) Inventor: Yaniv Kaul, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 598 days.

(21) Appl. No.: 18/073,262

(22) Filed: Dec. 1, 2022

(65) Prior Publication Data

US 2024/0184605 A1     Jun. 6, 2024

(51) Int. Cl.
*G06F 9/455*      (2018.01)
(52) U.S. Cl.
CPC .. *G06F 9/45533* (2013.01); *G06F 2009/4557* (2013.01)
(58) Field of Classification Search
CPC ................................................... G06F 9/45533
USPC .............................................................. 718/1
See application file for complete search history.

(56) References Cited

U.S. PATENT DOCUMENTS

| | | | | | |
|---|---|---|---|---|---|
| 5,991,804 | A | * | 11/1999 | Bolosky | .............. G06F 11/2094 709/213 |
| 7,599,962 | B2 | * | 10/2009 | Tanabe | ................ H04L 63/0428 |
| 9,223,616 | B2 | * | 12/2015 | Tsirkin | ................... G06F 9/4856 |
| 9,734,157 | B1 | * | 8/2017 | Brahma Raju | ........... G06F 3/06 |
| 10,437,865 | B1 | * | 10/2019 | Clements | .............. G06F 16/273 |
| 10,503,659 | B2 | * | 12/2019 | Tsirkin | ................ G06F 12/1009 |
| 10,691,477 | B2 | * | 6/2020 | Kaul | ................... G06F 9/45558 |

| | | | | | |
|---|---|---|---|---|---|
| 11,256,530 | B2 | * | 2/2022 | Jiang | ...................... G06F 12/109 |
| 11,307,888 | B2 | * | 4/2022 | Tsirkin | ................ G06F 9/44505 |
| 2011/0066819 | A1 | * | 3/2011 | Mashtizadeh | ....... G06F 9/45558 711/E12.001 |
| 2011/0271071 | A1 | * | 11/2011 | Nakatogawa | ......... G06F 3/0665 711/E12.002 |
| 2012/0166752 | A1 | * | 6/2012 | Taniyama | ............. G06F 3/0664 711/170 |

(Continued)

OTHER PUBLICATIONS

Changyeon et al. Efficient live migration of virtual machines using shared storage. School of Computer Science and Engineering, Seoul National University. 2013. ACM SIGPLAN Notices. 48. 41-50.

*Primary Examiner* — Mehran Kamran
(74) *Attorney, Agent, or Firm* — Kilpatrick Townsend & Stockton LLP

(57) ABSTRACT

The present disclosure is a new and innovative system, methods and apparatus live storage migration. In an example, a system includes a memory and processor in communication with the memory. The processor is configured to receive a request to perform live storage migration of a guest managed by a source hypervisor on a source machine to a destination machine. The guest is configured to store data in blocks of block storage. The source hypervisor, executing on the processor, receives a hint for each block of data in block storage of the guest via an agent of the guest, wherein the hint relates to properties of a specific block of data. The source hypervisor then determines an efficient prioritization that identifies which blocks to copy and in what order as a part of the live storage migration based on the hints received from the agent. The source hypervisor then copies the blocks of data identified for copying in the migration based on the prioritization, saving time and computational resources.

19 Claims, 4 Drawing Sheets

(56) References Cited

U.S. PATENT DOCUMENTS

| | | | |
|---|---|---|---|
| 2012/0284234 A1* | 11/2012 | Mashtizadeh | G06F 16/119 |
| | | | 707/E17.007 |
| 2013/0219139 A1* | 8/2013 | Wang | G06F 3/061 |
| | | | 711/E12.091 |
| 2014/0108854 A1* | 4/2014 | Antony | G06F 11/2046 |
| | | | 714/4.2 |
| 2017/0235641 A1* | 8/2017 | Ancel | G06F 11/1458 |
| | | | 707/654 |
| 2017/0242627 A1* | 8/2017 | Mills | G06F 3/065 |
| 2018/0004560 A1* | 1/2018 | Shankar | G06F 9/4856 |
| 2018/0088975 A1* | 3/2018 | Kaul | G06F 9/45558 |
| 2019/0370223 A1* | 12/2019 | Yang | G06F 3/0647 |
| 2020/0285620 A1* | 9/2020 | Patterson | G06F 16/214 |
| 2021/0034289 A1* | 2/2021 | Dalmatov | G06F 3/0616 |
| 2021/0073128 A1* | 3/2021 | Fukunaga | G06F 12/0866 |
| 2021/0263762 A1* | 8/2021 | Kachare | G06F 12/0862 |
| 2021/0342232 A1* | 11/2021 | Gopalan | G06F 11/1451 |
| 2021/0406050 A1* | 12/2021 | Huang | G06F 9/4856 |
| 2024/0184605 A1* | 6/2024 | Kaul | G06F 9/45558 |

* cited by examiner

200

Receiving a request to
perform a live storage
migration of a guest
201

Receiving a hint for each
block of data in block
storage
202

Determining a
prioritization that
identifies which blocks to
transfer and the order
which to transfer
203

Copying the blocks of
data identified for
migration based on the
prioritization
204

GUEST-ASSISTED LIVE STORAGE MIGRATION

BACKGROUND

Generally, live migration refers to the process of moving a running guest or application between different physical machines without disconnecting the guest or application. Live storage migration refers to the process of transferring the storage of a running guest or application from an original source machine to a destination machine without disconnecting the guest or application. This allows the guest on the source machine to keep running while storage is being set up and migrated to the destination machine.

SUMMARY

The present disclosure provides a new and innovative system and methods for the reduction of time and resources required for live storage migration.

In an example, a method includes receiving a request to perform live storage migration of a guest managed by a source hypervisor on a source machine to a destination machine. The guest is configured to store data in block storage. The method also includes receiving, by the source hypervisor, a hint for each block of data in block storage of the guest via an agent of the guest. Each hint relates to a property of a specific block in block storage. Then the source hypervisor may determine a prioritization that identifies which blocks to copy and an order of what blocks to copy as a part of the live storage migration. This prioritization is based on the hints received from the agent of the guest.

In an example, a system includes a memory and a processor in communication with the memory. The processor is configured to receive a request to initiate a live storage migration of a guest running on a source machine and managed by a source hypervisor to a destination machine. The processor on which the source hypervisor is executed, is also configured to receive, by the source hypervisor, a hint for each block in block storage relating to properties of the data stored in a specific block from an agent of the guest. Additionally, the processor, on which the source hypervisor is executed, is further configured to determine, by the source hypervisor a prioritization that identifies which blocks of data to copy and the order in which to copy as part of the live storage migration based on the hints received from the guest. The processor, on which the source hypervisor is executed, is also configured to copy the blocks of data identified for copying in the migration based on the prioritization.

In an example, a non-transitory machine readable medium stores code, which when executed by at least one processor is configured to receive a request to initiate a live storage migration of a guest running on a source machine and managed by a source hypervisor to a destination machine; receive, at a source hypervisor, a hint for each block in block storage relating to properties of the data stored in a specific block from an agent of the guest; determine, by the source hypervisor, a prioritization that identifies which blocks of data to copy and an order in which blocks of data to copy as part of the live storage migration, based on the hints received from the guest; and, copy the blocks of data identified for copy in the migration based on the prioritization.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

In many computer systems, physical hardware may host guests such as virtual machines and/or containers. In an example, a guest may be a virtual machine, a robust simulation of an actual physical computer system utilizing a source hypervisor to allocate physical resources to the virtual machine. In sharing physical computing resources, guests and/or a hypervisor controlling them, may also have access to shared components of the underlying physical host. A guest may migrate data in storage locations between physical machines through storage live migrations. Typically, live migration involves moving a running guest or application between different physical machines without disconnecting the guest or application, such that storage of the guest may be copied from the original source machine to the destination machine. During live storage migration of data stored in blocks in block storage, a hypervisor copies each block in block storage from the source machine to a destination machine regardless of the contents of the block. This results in time and computing resources being spent copying blocks that are empty or unimportant.

The present disclosure reduces the time and resources required for live storage migration by providing for guest-assisted live storage migration, where an agent of a guest provides a hypervisor managing the migration with hints relating to the contents of blocks in block storage order to determine an efficient prioritization of blocks to copy. The hypervisor then copies blocks from the source machine to a destination machine according to this prioritization ensuring that resources and time are spent copying blocks of value (as determined by the prioritization), and may perform the copying in order of higher value blocks (e.g., read only files, stored image or video files) to lower value blocks (e.g., temp files, empty space).

Figure 1:
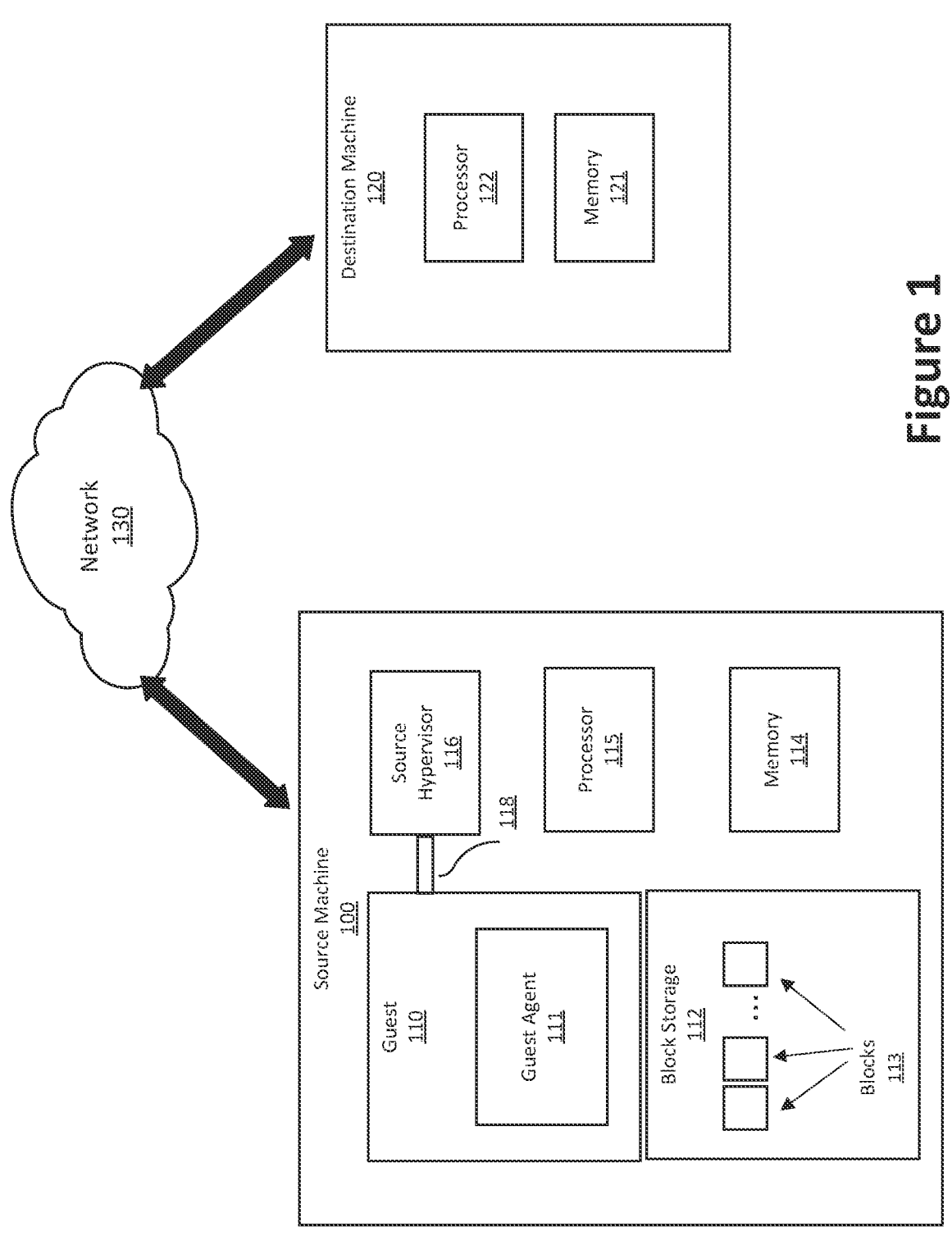
FIG. 1 illustrates an example embodiment of a system for guest-assisted live storage migration.

FIG. 1 illustrates an example embodiment of a system for guest-assisted live storage migration. A system may include a source machine 100 on which a guest 110, such as a Virtual Machine, is hosted. A source machine 100 may contain a memory 114 and a processor 115 in communication with the memory 114. The processor 115 may be a CPU, an ASIC, or any other similar device. A source machine 100 may have a source hypervisor 116 to oversee the allocation of the source machine's physical and virtual resources.

The guest 110 hosted on the source machine 100 is configured to store data in blocks 113 of block storage 112. Block storage 112 may refer to a hard drive, physical disks, or other physical implementations of block storage as well as virtual storage implementations, such as virtual hard disks.

The guest 110 is also configured to contain a guest agent 111. The guest agent 111 is a component of the guest 110 which may maintain a listing of the contents of the blocks 113 in block storage 112. Through this, the guest agent 111 is able to develop and to provide hints to the source hypervisor 116 to assist in the live storage migration to a destination machine 120. In some examples of the present disclosure, the guest 110 and source hypervisor 116 are configured to communicate through a dedicated hypervisor-guest channel 118. The destination machine may include a memory 121 and a processor 122 in communication with the memory 121. The live storage migration may take place over a network 130.

These hints may pertain to one or a number of properties regarding a specific block in block storage 112. For example, a hint from the guest agent 111 may include a compression status. A compression status may indicate whether the contents of a block need to be compressed before being copied as a part of the live storage migration. Additionally, a compression status may indicate that the contents of a block have been compressed already. Also, a compression status may indicate that a certain method of compression needs to be performed on the contents of a block or that a certain method of compression has already been performed on the contents of a block. In another example, a hint from the guest agent 111 may include a status indicating that a subrange of blocks in block storage have a common property. For example, blocks within a range, such as block addresses 127-150, all contain compressed video data, and so the source hypervisor 116 may receive a hint including a compression status indicating that blocks in that range all contain compressed data.

Based on the hints provided by the guest agent 111, the source hypervisor 116 determines a prioritization that identifies which blocks 113 to copy as a part of the live storage migration. This prioritization may indicate that certain blocks 113 should not be copied as a part of the live storage migration. In an example, block storage 112 on a source machine 100 may store blocks containing compressed data and non-compressed data as well as blocks that are empty. The prioritization may include identifying blocks 113 based on the received hints that have a status indicating that the block is empty and indicating that such blocks should not be copied as a part of the live storage migration. The prioritization may also include identifying blocks that have a compression status indicating that the block contains compressed data and specifying the copying of these blocks first in the live storage migration, followed by the copying of blocks with a compressions status indicating that they contain uncompressed data, and finally the removal of blocks that are empty from the live storage migration process. This saves time and computing resources that would normally be spent copying empty blocks of block storage from one machine to another.

Figure 2:
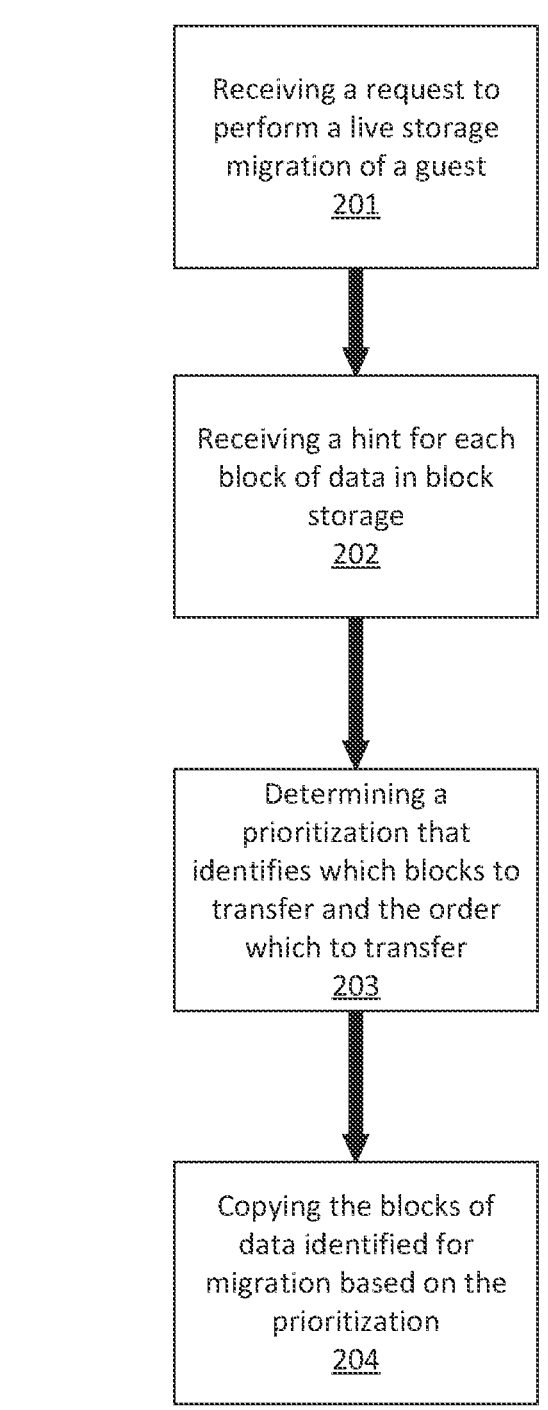
FIG. 2 is a block flowchart illustrating an example embodiment according to a method for guest-assisted live storage migration of the present disclosure.

FIG. 2 is a flowchart illustrating a method for guest-assisted live storage migration according to the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated, and some of the blocks described are optional. The method 200 may be performed by processing logic that may comprise hardware (circuitry, dedicated logic, etc.), software, or a combination of both.

In example method 200, a request to perform a live storage request of a guest is received (block 201) For example, when a video processing application executing on the guest 110 requires faster retrieval time of data from the storage, the application may trigger a request to perform a live storage migration to allow for faster data access. Then, example method 200 includes receiving a hint for each block in block storage (block 202). For example, an agent 111 of the guest 110 may provide a source hypervisor 116 with hints for each block of data in block storage 112. These hints may pertain to a property of each block, such a status indicating that a block contains temporary files created for temporary use by the application, or a status indicating that a block is empty.

Also, example method 200 includes determining a prioritization that identifies which blocks to transfer and the order which to transfer (block 203). For example, an application executing on the guest 110 may create files for temporary use by the application, which are stored in blocks 113 in block storage 112; however, these files are of little importance after they are generated, and so the source hypervisor may determine a prioritization that includes copying all blocks in block storage that do not contain temporary files first and not copying blocks with temporary files as part of the live storage migration based on the received hints.

In another example, the prioritization may represent an iterative process for copying different blocks based on different block properties. For example, the prioritization determined by the hypervisor 116 based on the hints received from the guest agent 111 may specify that blocks 113 that have a compression status indicating that the block contains compressed data should be copied as a part of the live storage migration first; followed by blocks 113 with a status indicating that the block contains temporary files; and, followed by blocks 113 with a compression status indicating that the block contains uncompressed data.

Example method 200 continues to include copying the blocks identified for migration based on the prioritization (block 204). For example, an application executing on the guest 110 may create files for temporary use by the application, which are stored in blocks 113 in block storage 112. The application may also store video data that is compressed and video data that is not compressed in blocks 113 in block storage 112. Based on the determined prioritization established using hints provided by a guest agent 111, a source hypervisor 116 may copy blocks of compressed video data first (e.g. block 126), followed by blocks containing uncompressed video data, and finally, not copying blocks containing temporary files to the destination machine 120 as part of the live storage migration according to the determined prioritization.

A method according to an example of the present disclosure may also include the source hypervisor copying blocks to both the source machine 100 and the destination machine 120 in the event an error occurs or there is an interruption to the live storage migration. For example, a user error during a live storage migration could result in the restarting of the guest, interrupting the provision of hints to the source hypervisor, the determining of the prioritization, and, thus the live storage migration process. In this event, the source hypervisor may be configured to copy blocks to both the destination machine and the source machine using the last prioritization determined before the occurrence of the error.

Figure 3:
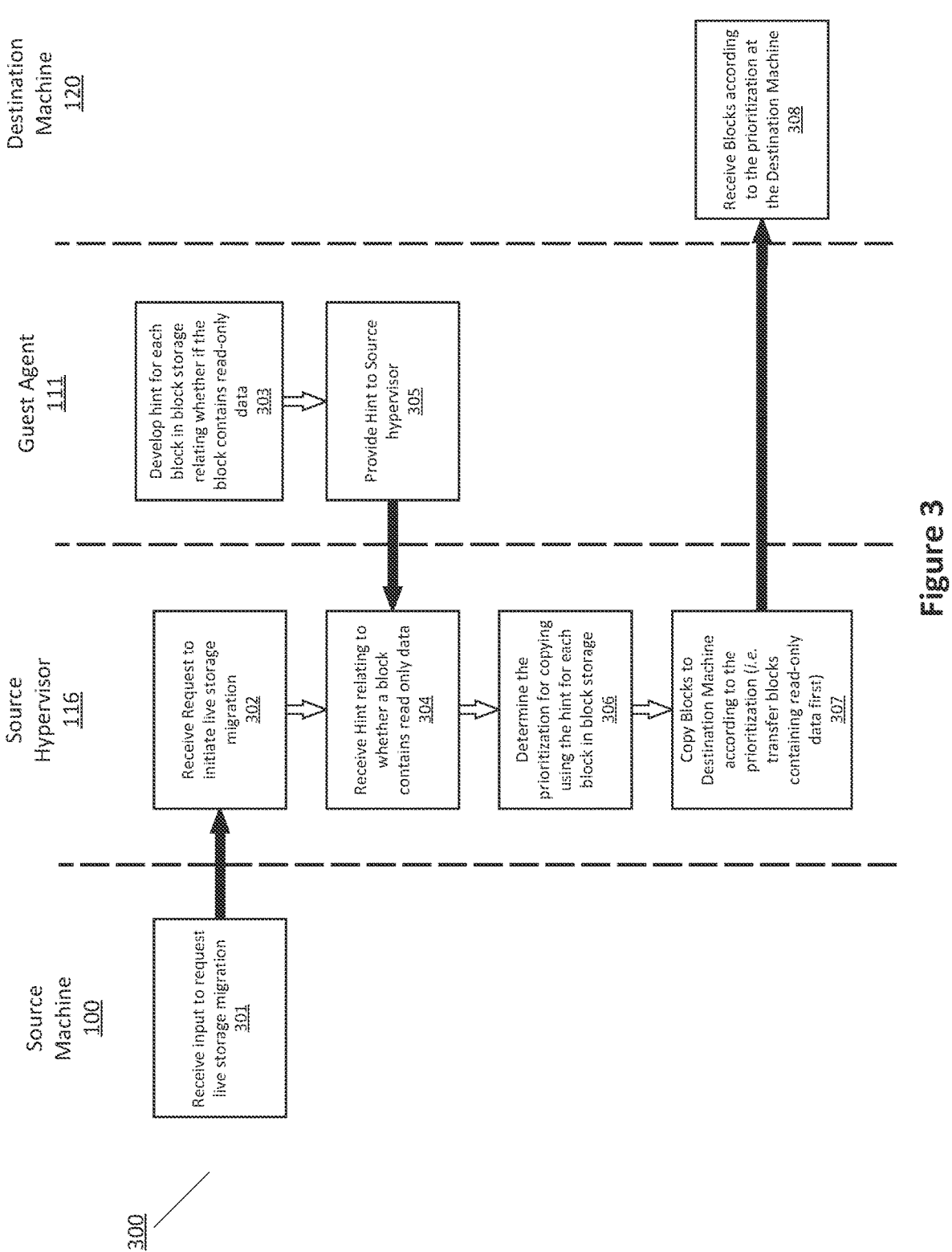
FIG. 3 is a flow diagram illustrating an example embodiment according to the present disclosure.

FIG. 3 is a flow diagram of an embodiment of the present disclosure. Although the example method 300 is described with reference to the flow diagram illustrated in FIG. 3, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuitry, dedicated logic, etc.), software, or a combination of both. For example, a source machine 100 may include a source hypervisor 116 to manage its storage resources including those of hosted guests (e.g. guest 110) and associated guest agents (e.g. guest agent 111) and the migration of these storage resources to a destination machine 120 as part of a live storage migration.

In example method 300, the source machine receives input to request a live storage migration (block 301), a request which is then received by the source hypervisor (block 302). For example, a source machine 120 may require physical maintenance, and so a user may provide the source machine 120 with input that corresponds to requesting a live storage migration of the source machine 120. That request to initiate a live storage migration is received by the source hypervisor 116.

Example method 300 also includes a guest agent 111 develops, or has previously developed, hints for each block 113 in block storage 112 that relate to a property of the block's contents (block 303). For example, a guest agent 111 of a virtual machine (e.g. guest 110) has previously stored a record of the contents of the blocks 113 in block storage 112, which it uses to develop hints for each block (e.g. block 126), such as a status indicating that a block contains read-only data. In another example, as users can write to blocks in storage during the live storage migration, a hint may include a status indicating whether a block contains static data or dynamic data.

Data that changes less frequently, such as read-only data or static data, is less likely to change during the live storage migration, so by copying these blocks first, it is more likely that changes to non-read-only/dynamic data are captured during the first instance of copying those blocks containing that data, saving time and computing resources. In example method 300, the guest agent 111 provides the source hypervisor 116 with these hints for each block (blocks 304, 305). For example, the source hypervisor 116 may receive a hint from the guest agent 111 that includes a status indicating whether or not a block contains read-only data. Additionally, the source hypervisor 116 may be configured to ignore a hint provided to it, such as if it detects the hint was sent from a malicious guest.

Example method 300 continues to include the source hypervisor 116 determining a prioritization that identifies which blocks and in what order these blocks may be copied as a part of the live storage migration, based on the hints for each block 113 in block storage 112 (block 306). For example, the source hypervisor 116 may determine a prioritization, based on the hints, that comprises copying blocks containing read-only data first followed by copying blocks that do not contain read-only data. Alternatively, based on the hint provided to the hypervisor 116, a prioritization may include identifying blocks that have a status indicating that the block contains dynamic data and indicating that such blocks should be copied last, such that any changes made to the data in these blocks during the live storage migration are captured Subsequently, example method 300 includes the source hypervisor 116 copying blocks to the destination machine 120, according to the determined prioritization (blocks 307, 308). For example, as a part of a live storage migration, the source hypervisor 116 may copy all blocks that contain read-only data first, as indicated by a status from the guest agent's 111 hint, and then copy all blocks containing non-read-only data, according to the determined prioritization.

A method according to an example of the present disclosure may also include monitoring which blocks of data are copied to the destination machine as a part of the live storage migration process and generating a log of which blocks have already been copied to the destination machine 120. For example, the guest agent 111 may be configured to record a listing of each block that is copied to the destination machine 120 as a part of the live storage migration and may use these listings in developing hints provided to the source hypervisor 116, such as a hint including a status indicating that the block contains read-only data and has already been copied. This may results in an iterative live storage migration that, after the first iteration, only copies data that is capable of changing during the migration, saving time and resources by not repetitively copying read-only data that is not likely to change during the live storage migration process.

Figure 4:
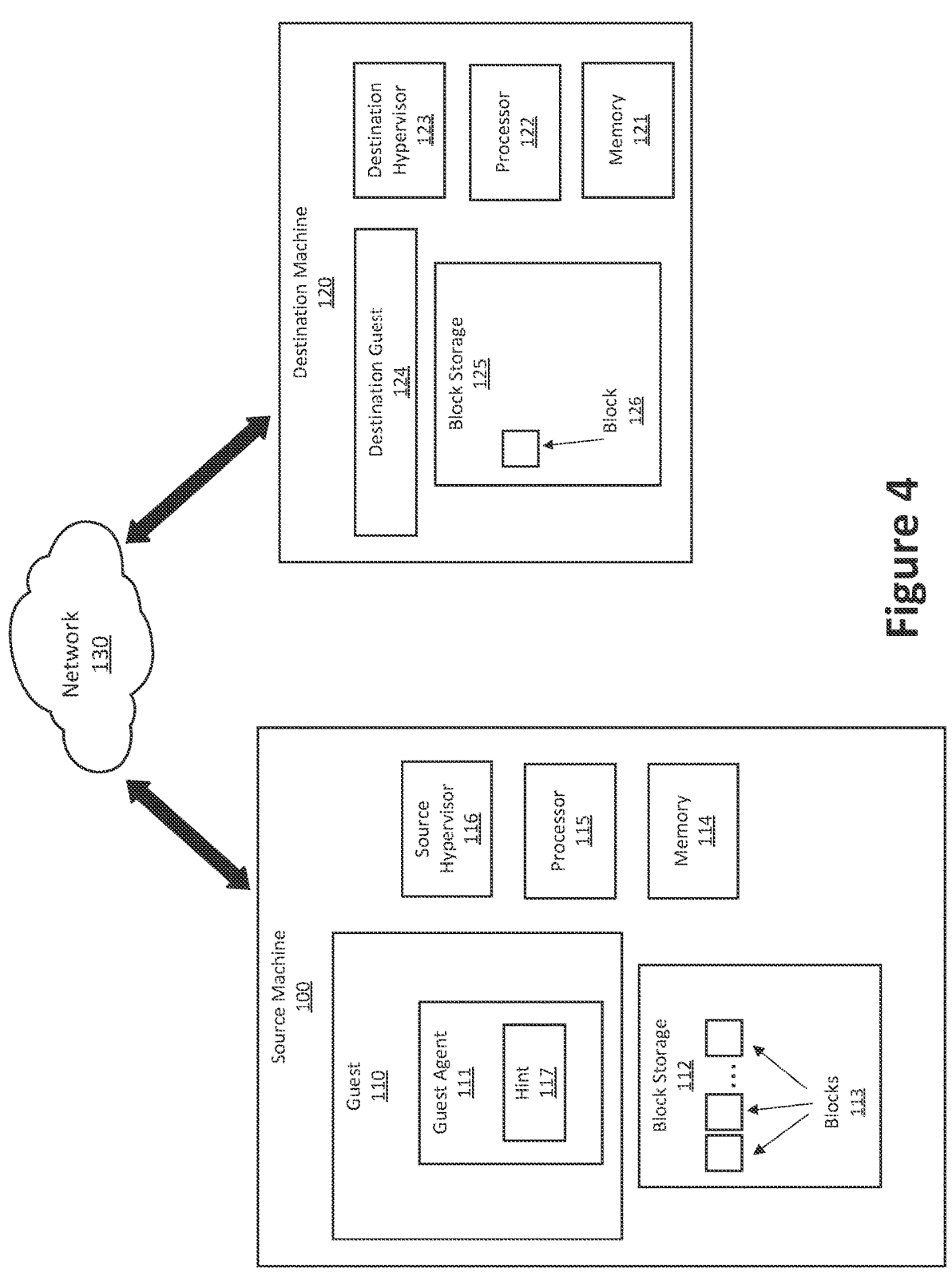
FIG. 4 illustrates an example embodiment of a system for guest-assisted live storage migration.

FIG. 4 illustrates an example embodiment of a system for guest-assisted live storage migration of a guest 110 on a source machine 100 to a destination machine 120. Destination machine 120 may include a memory 121 and a processor 122 in communication with the memory 121. Destination machine 120 may also include a destination hypervisor 123 and host a destination guest 124.

The source machine 100 receives a request to perform a live storage migration of the guest 110, configured to store blocks 113 in block storage 112. The live storage migration is managed by a source hypervisor 116. To promote the efficient use of computing resources, a guest agent 111 records a listing of the contents of each block 113 in block storage 112 and develops a hint 117 for each block 113 in block storage 112. The hint 117 relates to some property of the contents of the block for which the hint 117 is directed.

For example, the hint 117 could include a status indicating that the block is empty. The guest agent 111 provides the hint 117 to the source hypervisor 116 managing the live storage migration. Based on the hints received from the guest agent 111, the source hypervisor determines a prioritization for which each block in block storage 112 should be copied as a part of the live migration process to the block storage 125 located on the destination machine 120. The prioritization may represent the iterative process of live storage migration by including a priority based on different properties of each block in block storage 112 for each iteration. For example, based on hints, the source hypervisor 116 may determine a prioritization that calls for the copying of blocks containing read-only data first; followed by the copying of all blocks containing compressed data; and, followed next by the copying of the remaining blocks that are not empty. The source hypervisor 1116 then copies blocks 113 in block storage 112 on the source machine 100 to the block storage 125 on the destination machine 120 according to the prioritization.

In live storage migration known in the art, a hypervisor typically blindly copies all blocks in block storage on the source machine and copies them to a destination machine, even when the blocks are empty or contain unimportant information. As a result of a system for performing guest-assisted live storage migration, according to an aspect of the present disclosure, live storage migration is performed efficiently. A guest agent provides a source hypervisor hints that relate to properties for each block in block storage, allowing the hypervisor to determine a prioritization for copying blocks from the source machine to the destination machine. This prioritization allows for the discarding of blocks containing unimportant data from the live storage migration, reducing the time in which a live storage migration can be performed and the resources, such as bandwidth and power consumption, required to perform a live storage migration.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

The invention is claimed as follows:

1. A system comprising:
a memory; and
a processor in communication with the memory, wherein the processor is configured to:
receive a request to initiate a live storage migration of a guest running on a source machine and managed by a source hypervisor to a destination machine;
receive, by the source hypervisor, a hint for each block in block storage relating to properties of data stored in a specific block from an agent of the guest, wherein a first hint includes a status indicating that a first block of data is empty, wherein a second hint includes a compressed status of a second block of data, and wherein a third hint includes an uncompressed status of a third block of data;
determine, by the source hypervisor, a prioritization that identifies which blocks of data to copy and an order in which to copy as part of the live storage migration based on the hints received from the guest, wherein the prioritization indicates that the first block of data that is empty is not to be copied as part of the live storage migration, and wherein the prioritization further indicates that the second block of data is to be copied before the third block of data in the live storage migration; and
copy the blocks of data identified for copy in the live storage migration based on the prioritization.

2. The system of claim 1, wherein a fourth hint includes another status indicating that a fourth block of data contains read-only data, and wherein the prioritization further indicates that the fourth block of data is to be copied before the second block of data in the live storage migration.

3. The system of claim 1, wherein a fifth hint includes another status indicating that a fifth block of data contains temporary files, and wherein the prioritization further indicates that the fifth block of data is to be copied after the second block of data and before the third block of data in the live storage migration.

4. The system of claim 1, wherein a sixth hint indicates that a sixth block of data contains static data and a seventh hint indicates that a seventh block of data contains dynamic data, wherein the prioritization further indicates that the sixth block of data is to be copied before the seventh block of data in the live storage migration.

5. The system of claim 1, wherein the hints include another status indicating that a subrange of blocks in block storage have a common property.

6. The system of claim 1, wherein the agent is configured to monitor what blocks of data are copied as part of the live storage migration and to log which blocks of data have already been copied.

7. A method comprising:
receiving a request to perform live storage migration of a guest managed by a source hypervisor on a source machine to a destination machine, wherein the guest is configured to store data in blocks of block storage;
receiving, by the source hypervisor, a hint for each block of data in block storage of the guest via an agent of the guest, wherein the hint relates to properties of a specific block of data, wherein a first hint includes a status indicating that a first block of data is empty, wherein a second hint includes a compressed status of a second block of data, and wherein a third hint includes an uncompressed status of a third block of data;
determining, by the source hypervisor, a prioritization that identifies which blocks to copy and an order in which to copy as a part of the live storage migration based on the hints received from the agent, wherein the prioritization indicates that the first block of data that is empty is not to be copied as part of the live storage migration, and wherein the prioritization further indicates that the second block of data is to be copied before the third block of data in the live storage migration; and
copying the blocks of data identified for copying in the live storage migration based on the prioritization.

8. The method of claim 7, wherein the copy of blocks of data is an iterative process based on the prioritization of blocks to migrate.

9. The method of claim 7, wherein a fourth hint includes another status indicating that a fourth block of data contains read-only data, and wherein the prioritization further indicates that the fourth block of data is to be copied before the second block of data in the live storage migration.

10. The method of claim 7, wherein a fifth hint includes another status indicating that a fifth block of data contains temporary files, and wherein the prioritization further indicates that the fifth block of data is to be copied after the second block of data and before the third block of data in the live storage migration.

11. The method of claim 7, wherein a sixth hint indicates that a sixth block of data contains static data and a seventh hint indicates that a seventh block of data contains dynamic data, wherein the prioritization further indicates that the sixth block of data is to be copied before the seventh block of data in the live storage migration.

12. The method of claim 7, wherein the hints include a status indicating that a subrange of blocks in block storage have a common property.

13. The method of claim 7, further comprising monitoring which blocks of data are copied to the destination machine as a part of the live storage migration and creating a log of which blocks have been previously copied.

14. A non-transitory computer readable medium storing instructions, which when executed by a processor, are configured to cause the processor to:

receive a request to initiate a live storage migration of a guest running on a source machine and managed by a source hypervisor to a destination machine;

receive, at the source hypervisor, a hint for each block in block storage relating to properties of data stored in a specific block from an agent of the guest, wherein a first hint includes a status indicating that a first block of data is empty, wherein a second hint includes a compressed status of a second block of data, and wherein a third hint includes an uncompressed status of a third block of data;

determine, by the source hypervisor, a prioritization that identifies which blocks of data to copy and an order in which to copy as part of the live storage migration based on the hints received from the guest, wherein the prioritization indicates that the first block of data that is empty is not to be copied as part of the live storage migration, and wherein the prioritization further indicates that the second block of data is to be copied before the third block of data in the live storage migration; and copy the blocks of data identified for copy in the live storage migration based on the prioritization.

15. The non-transitory computer readable medium of claim 14, wherein a fifth hint includes another status indicating that a fifth block of data contains temporary files, and wherein the prioritization further indicates that the fifth block of data is to be copied after the second block of data and before the third block of data in the live storage migration.

16. The non-transitory computer readable medium of claim 14, wherein a sixth hint indicates that a sixth block of data contains static data and a seventh hint indicates that a seventh block of data contains dynamic data, wherein the prioritization further indicates that the sixth block of data is to be copied before the seventh block of data in the live storage migration.

17. The non-transitory computer readable medium of claim 14, wherein a fourth hint includes another status indicating that a fourth block of data contains read-only data, and wherein the prioritization further indicates that the fourth block of data is to be copied before the second block of data in the live storage migration.

18. The non-transitory computer readable medium of claim 14, wherein the hints include another status indicating that a subrange of blocks in block storage have a common property.

19. The non-transitory computer readable medium of claim 14, wherein the agent is configured to monitor what blocks of data are copied as part of the live storage migration and to log which blocks of data have already been copied.

* * * * *